TRANSISTORIZED TRANSMITTER EMPLOYING A TRANSMISSION LINE SECTION

Filed Jan. 23, 1962

INVENTOR.
JAMES C. MITCHELL, JR.
BY
J.C. Muller
ATTORNEY.

United States Patent Office 3,189,823
Patented June 15, 1965

3,189,823
TRANSISTORIZED TRANSMITTER EMPLOYING A TRANSMISSION LINE SECTION

James C. Mitchell, Jr., of China Lake, Calif., assignor to the United States of America as represented by the Secretary of the Navy Filed Jan. 23, 1962, Ser. No. 168,290
6 Claims. (Cl. 325—126)
(Granted under Title 35, U.S. Code (1952), sec. 266)

The invention described herein may be manufactured and used by or for the Government of the United States of America for governmental purposes without the payment of any royalties thereon or therefor.

This invention relates to improvements in oscillator circuits of the type employing transmission line sections to provide a tuned circuit element, and more particularly to such circuits employing transistors.

At higher radio frequencies, such as in the 100–200 megacycle (mc.) range, there are two forms of circuit constructions of tuned circuits. The first of these consists of ordinary coils and capacitors which are treated as though their respective electrical characteristics were "lumped" into one discrete element within the tuned circuit. An advantage of this form of circuit construction is that the inductance coils and capacitors have a physical size in the order of a fraction of an inch and therefore allow installation of the tuned circuit in a very small space. This advantage has become very significant with the availability of transistor devices which are in some instances no larger than the eraser at the end of a pencil and which often replace the larger vacuum tubes used under older practices. Thus by employing the coil and capacitor form of construction with transistors, oscillators may be constructed to fit in very limited spaces. However, a disadvantage of using ordinary coils in the construction of tuned circuits is the exceeding amount of care that must go into winding and sizing the coils to obtain the precise electrical characteristics required, and the need for adjustment of the physical relationships of the coils to one another and to other circuit elements to avoid undesired interference due to the tendency of intercoupling of energy between coil elements. As a result, oscillators built with coil elements are expensive to design and fabricate.

A second form of tuned circuit element is the transmission line section. In its simplest form a transmission line consists of two wires separated by uniform distance, such as the common television wire arrangement that connects a receiver and its antenna. The electrical length of a transmission line is stated in terms of the ratio of its physical length to a "wave length" at the frequency of operation. In simplest terms, a "wave length" is the distance that wave motion of an electrical signal travels through the transmission line during one oscillation of the signal. A known practice in the prior art has been to employ a transmission line having a length equal to one quarter of a wave length and having one of its ends shunted by a reactance which acts as a short circuit to currents at the operating frequency. If a signal source is connected across the non-shunted end of such transmission line arrangement it acts as a resonant circuit with a 180° electrical phase shift across the non-shunted end. In contrast to the ordinary coil and capacitor circuits in which the coil and capacitor elements are employed as "lumped" elements, it can be demonstrated that this shunt ended quarter wave length acts as though infinitesimal reactances were "distributed" throughout the line with the tuned resonance resulting from the wave motion of the electrical signal along the line, and the shunt presenting a sharp transmission line discontinuity which reflects the wave motion. An advantage of this form of tuned circuit construction is that the desired electrical characteristics may be simply, reliably and inexpensively obtained by merely cutting a transmission line to a definite length. Also such transmission lines are not, in general, subject to interference by intercoupling of energy, and the direct current (D.C.) operating potential required by the transistor or other amplifying device may be conveniently applied to the amplifying device through the conductors with the necessary isolation of these D.C. potentials maintained by their separation. A disadvantage is that the physical length of a quarter wave length line, which in the 100–200 mc. range is equal to one foot or more, requires considerable space. Also, the relatively long lines are susceptible to mechanical vibration which causes unauthorized frequency modulation, frequency shift, and other adverse effects on oscillator output.

A known approach toward reducing the physical space required for transmission line oscillators has been to "fold" or "double back" a quarter wave length section, which reduces the space requirements by a factor of two. Although satisfactory oscillator operation can be obtained with this approach, the space requirement is still excessive for many applications. Further, folding back of the double conductor line results in a wiring arrangement having four parallel conductor portions, and it has been found that a complex isolation of the D.C. potential among these portions is required, resulting in forfeiture of a measure of the convenience sought by using transmission line sections in the first instance.

Accordingly, an object of the present invention is to provide an improved oscillator circuit of the type employing a transmission line section to form its tuned circuit which occupies less space than prior art devices.

Another object is to provide a novel oscillator which is simple and inexpensive to construct.

Other objects and many of the attendant advantages of this invention will be readily appreciated as the same becomes better understood by reference to the following detailed description when considered in connection with the accompanying drawings wherein.

Figure 1:
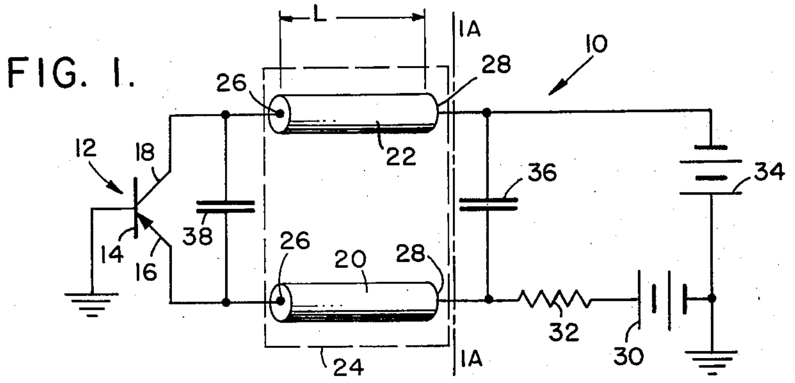
FIG. 1 is a composite structural and schematic wiring diagram of an oscillator circuit forming the subject of the invention.

Referring now to the drawing, and in particular to FIG. 1, an oscillator circuit 10 comprises a transistor 12 having base 14, emitter 16 and collector 18 electrodes. Transistor 12 is preferably of a type having a high $\beta$ (beta) cut off frequency, such as the microalloy diffused transistor and may be of the PNP conductivity type as shown by the accepted schematic symbol. A transistor load circuit comprises two parallel co-extensive conductors 20, 22 forming an open wire transmission line section 24, represented by dashed line block, having an input end 26 and a terminal end 28. At the input end 26, conductor 20 is connected to emitter 16 and conductor 22 is connected to collector 18. A source of direct current (D.C.) potential, such as battery 30 has its positive terminal connected to conductor 20 at terminal end 28 of the line through a current limiting resistor 32, and its negative terminal to a reference potential such as ground. Resistor 32 is a current limiting resistor serving to protect the transistor against damage by excess current. Another source of D.C. potential, such as a battery 34, has its negative terminal connected to conductor 22 at terminal end 28 and its positive terminal to ground. Base 14 is returned to the ground reference potential effectively placing battery 30 between base 14 and emitter 16, and placing battery 34 between base 14 and collector 18, with the batteries polarized to provide the requisite D.C. biases between the respective electrodes for energizing the transistor. At end 28 of line 24 R.F. shunting capacitor 36 is connected between conductor 20 and conductor 22, providing a substantial short circuit across end 28 at oscillation frequency.

In accordance with the invention, transmission line section 24 is chosen to have a length L substantially less than a quarter wavelength at the frequency of oscillation. For example, excellent results in providing a 160 megacycle (mc.) oscillator have been obtained by employing a conventional 300 ohm transmission line, having a length L equal to three inches. At 160 megacycles such 3-inch section represents somewhat more than one-sixteenth of a wave length. Then there is provided, between emitter 16 and collector 18, such additional capacitance as may be required to cause circuit 10 to oscillate, as by connection of a capacitance supplementing capacitor 38 between the emitter and collector. The oscillations may be coupled from the circuit by inductive or capacitance coupling methods known in the art, or where radio propagation is desired, the energy may be directly radiated from the line. It is to be noted that at higher radio frequencies there are obscure sources of capacitance existing between these electrodes before the connection of the capacitor 38, such as the inter-electrode capacitance inherent to the transistor structure, stray capacitances, and capacitances between conductors 20, 22 inherent to transmission line 24. It has been further found that a margin of adjustment of the frequency of oscillation may be obtained by adjusting the value of capacitor 38, with an increase in capacitance decreasing the frequency of oscillation.

Figure 1A:
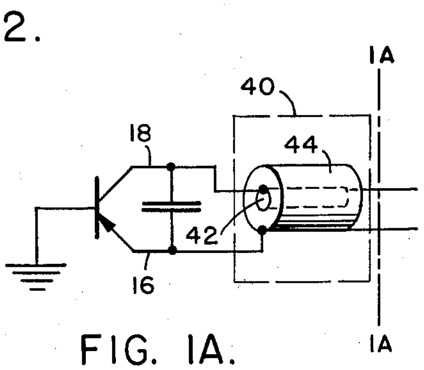
FIG. 1A is a modification of the circuit of FIG. 1, the circuit of FIG. 1A replacing that part of FIG. 1 to the left of dividing line 1A—1A.

FIG. 1A illustrates a modification of the circuit of FIG. 1, the main difference being that a length of co-axial transmission line section 40 consisting of an inner conductor 42 and a concentric shell-like outer conductor 44 is employed instead of the open wire conductor of FIG. 1. Emitter 16 of transistor 12 is connected to outer conductor 44 and collector 18 is connected to inner conductor 42. The oscillations may be coupled from the circuit by means of conventional pickup loop or probe (not shown) extending into the space between the inner and outer conductor of the co-axial line through a suitable opening in outer conductor 44.

Figure 2:
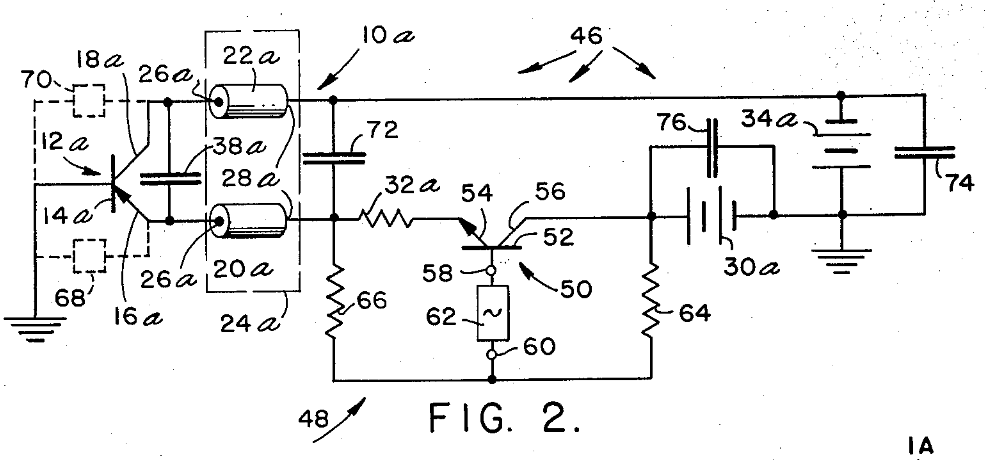
FIG. 2 is a composite structural and schematic wiring diagram of a frequency modulated radio transmitter utilizing the oscillator circuit of the present invention as its carrier oscillator.

Referring now to FIG. 2, a frequency modulated radio transmitter 46, of the type employed for transmitting instrument measurements from remote locations (telemetry), includes an oscillator circuit 10*a*, generally similar to FIG. 1 with corresponding parts thereof assigned the same designation number with a suffix letter "*a*." A modulation current amplifying stage 48 comprises a transistor 50 having base 52, emitter 54 and collector 56 electrodes. The input for the modulating signal is formed by a pair of terminals 58 and 60. Transistor 50 is of a conductivity type opposite to transistor 12*a*, otherwise characterized as of the NPN type as shown by the accepted symbol. The emitter-collector path of transistor 50 is connected between battery 30*a* and resistor 32*a* and so poled that the forward current direction through the emitter-collector path of transistor 50 corresponds to the forward current direction through emitter 16*a* of transistor 12*a*. Any suitable modulating instrumentality 62 of the type having an alternating current (A.C.) output and having a low internal resistance to direct current (D.C.) may be connected across terminals 58, 60. A preferred telemetering arrangement is an A.C. Wheatstone bridge scheme in which the balance points of the bridge are connected across terminals 58 and 60 and a measuring instrument providing a variable impedance output is connected as one of the bridge legs to provide an A.C. amplitude variation at the balance points of the bridge. If short range voice communication is desired a dynamic microphone may be connected across terminals 58 and 60. A pair of series connected resistors 64 and 66 are connected between the positive terminals of battery 30*a* and the junction of resistor 32*a* and conductor 20*a* with the junction point between the resistors connected to input terminal 60, thereby forming a voltage dividing network to provide the operating biases for transistor 50, and completing the D.C. path between input terminal 60 and emitter 54. Transistor action of transistor 50 amplifies the A.C. signals of modulating instrumentality 62, providing an amplified A.C. current component through the transistor main current flow path between emitter 54 and collector 58, which in turn modulates the bias current through the emitter-base path of transistor 12*a*, since the two paths are in series circuit relationship. It is a transistor characteristic that there is an effective inter-electrode impedance 68 (shown in broken line) between emitter 16*a* and base 14*a* and a similar effective impedance 70 between base 14*a* and collector 18*a*. At higher radio frequencies impedances 68 and 70 are series connected across the input end 26*a* of transmission line 24*a* and constitute one of the tuning elements that determine the frequency of oscillation of the carrier oscillator circuit 10*a*. It is a transistor characteristic that effective impedance 68 varies as a function of the bias current through the base-emitter path of transistor 12*a*. Thus the modulations in bias current are translated into impedance variation which in turn modulates the frequency output of oscillator 10*a*. Conductors 20*a* and 22*a* of the transmission line form the radiating element for the transmitter, from which the radio energy is propagated. A minor difference from FIG. 1 is that an R.F. shunting capacitor 72 corresponds in function to capacitor 36 (FIG. 1), but is also chosen to present a substantial reactance to the modulation frequencies. A modulation frequency by-pass capacitor 74 is connected across battery 34*a* and similar by-pass capacitor 76 is placed across battery 30*a*.

Figure 3:
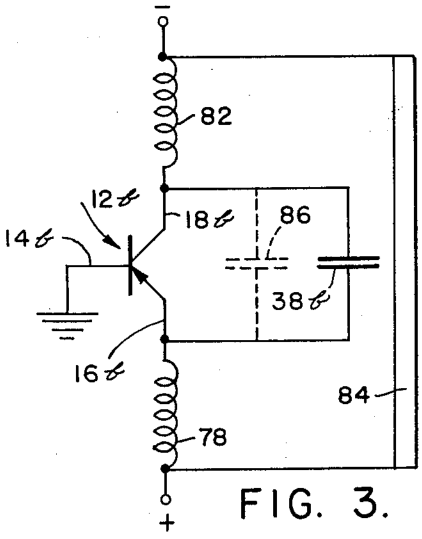
FIG. 3 is an equivalent impedance circuit diagram of FIG. 1 at oscillation frequency.

The nature of the phenomenon illustrated by the operation of the oscillator circuits of the above described apparatus is by no means completely understood. Nevertheless several conclusions have been presently drawn. Firstly, in forming the tuned circuit the transmission line section is believed to be utilized in a manner by which it contributes "lumped" rather than "distributed" impedance, as in the quarter wave section arrangement of the hereinbefore described prior art devices. In particular the conductors of the transmission line are believed to be functioning as discrete high Q "lumped" inductances. If this is correct, the equivalent inductance and capacitance schematic diagram at oscillation frequency of the oscillator circuit of FIG. 1 would appear as shown in FIG. 3, in which some of the corresponding parts have the same designation numerals in FIG. 1 but with the suffix letter "*b*." An inductance 78, contributed by conductor 20 (FIG. 1), extends between emitter 16*b* and the positive D.C. source, and an inductance 82, contributed by conductor 22 (FIG. 1) extends between collector 18*b* and the negative D.C. source. An effective short circuit at the frequency of oscillation provided by R.F. shunting capacitor 36 (FIG. 1) and represented by shorting bar 84, extends between the end of inductance 82 connected to the negative source and the end of inductance 78 connected to the positive source. An effective capacitance 86, corresponding to the effective capacitance provided by the hereinbefore described obscure sources is connected in parallel with capacitor 38. Since the circuit does not oscillate until the additional capacitance of capacitor 38*b* is provided, it may be assumed that capacitor 38*b* contributes correctional effects which allow generation of oscillation by the circuit. One reasonable conclusion is that capacitor 38*b* combines with other inductance and capacitance elements in the circuit to tune the circuit into resonance, as is suggested by the previously noted margin of tuning obtainable by adjustment of the value of the capacitor. Capacitor 38 may also serve as a phase correcting means to correct the phase relationship of the R.F. signal between emitter **16*b* and collector 18*b* of transistor device 12*b* to allow the feedback through inductance 78** to be effective to cause oscillation by transistor action, but any definite conclusions are difficult because at the present time relatively little is known of phase relationships between electrodes at the higher radio frequencies. The importance of drawing these tentative conclusions lies in the fact that the practice of this invention may not be limited to the circuit arrangements disclosed. For example, with the continuous progress being made in the art of semi-conductor devices for the higher radio frequency it is possible that electronic valve devices having different inter-electrode cooperations will be available, and it will be within the skill of the art to design oscillator circuits in accordance with the teachings of the invention. Also the circuit arrangement disclosed herein may at different frequencies differ in their physical components. For example, at certain frequencies, impedances shown as definite elements in the disclosed embodiments may be supplied by obscure impedance sources of the type hereinbefore noted.

Whatever the reason for obtaining the oscillation with the above described apparatus, it has been definitely established that an oscillation circuit may be produced employing a transmission section having an appreciably smaller length than required with any of hereinbefore mentioned prior art devices, and with a simple circuit configuration which is simple to fabricate with reliably reproducible electric characteristics.

While it is to be understood that the circuit specification will vary according to any design consideration, the following list of components is included by way of example only for the circuit 46 of FIG. 3 for an operating frequency of 160 megacycles per second.

Transistor **12*a***—Micro alloy diffused type 2N500
Transistor 50—Junction type 2N167
Capacitor 38—10 micromicrofarads
Transmission Line **24*a***—3 inches of 300 ohm transmission line (polyethylene twinline of the type used with television receivers)
Capacitor 72—5000 micromicrofarads
Capacitors 74, 76—10 microfarads
Batteries **30*a* and 34*a***—6 volts
Resistor **32*a***—20 ohms
Resistor 66—680 ohms
Resistor 64—6,800 ohms Obviously many modifications and variations of the present invention are possible in the light of the above teachings. It is therefore to be understood that within the scope of the appended claims the invention may be practiced otherwise than as specifically described.

What is claimed is:

1. In an oscillator circuit for generating oscillations at a desired frequency and of the type employing a transistor and a parallel wire transmission line section, the combination, comprising;

(a) a transistor having base, emitter and collector electrodes and of a type adapted to have a sufficiently high beta cut off frequency to provide effective oscillation sustaining operation at said desired frequency,
said base and emitter electrodes defining a transistor control path including an emitter current limiting resistive element in series circuit relationship, (b) a transmission line section comprising first and second parallel spaced co-extensive conductor wires spaced by a conventional distance adapted to provide distributed constant transmission line network characteristics,
said transmission line section having a predetermined electrical length less than one-eighth of a wavelength at said desired frequency, (c) said emitter electrode and said collector electrode, being connected to said first and second conductor wires, respectively, at one of their co-adjacent ends, (d) a lumped constant capacitative circuit element connected between said emitter and collector electrodes, (e) means operating as an effective short circuit at the frequency of oscillation inter-connecting the other co-adjacent ends of the conductor wires and the base electrode, and by-passing said emitter current limiting resistance element
whereby said first conductor wire, at the frequency of oscillation, has its opposite ends effectively connected directly to the base and emitter electrodes, respectively, (f) said capacitative circuit element having such value of capacitance and said transmission line section being of such effective length that, in operation, feedback from the transmission line section, principally by way of the first conductor wire across the base and emitter electrode, is such as to sustain oscillations in the circuit.

2. The oscillator circuit of claim 1 employed as a frequency modulation radio transmitter, the combination further including, (l) an input for receiving a modulating signal, and
(m) variable impedance means responsive to said modulating signal and serially connected in said transistor control path,
(n) said transmission line further serving as the transmitter radiating element.

3. The oscillator circuit of claim 1 in which, (k) the electrical length of the transmission line circuit is approximately one-sixteenth of said wavelength.

4. The oscillator circuit of claim 1 in which (g) said collector electrode is connected through said second conductor wire to one side of a collector biasing potential source and said emitter is connected through said first conductor wire and through said emitter current limiting resistive element to one side of an emitter biasing potential source which is at a polarity opposite to that of said one side of the collector biasing potential source, and
said base electrode is connected to the other side of the sources of potentials.

5. The oscillator circuit of claim 4 in which (h) said base is connected to said other sides of the sources of potentials through a physical ground return of the circuit.

6. In an oscillator circuit for generating oscillations at a desired frequency and of the type employing a transistor and a parallel wire transmission line section, the combination, comprising;

(a) a transistor having base, emitter and collector electrodes and of a type adapted to have a sufficiently high beta cut off frequency to provide effective oscillation sustaining operation at said desired frequency, said base and emitter electrodes defining a transistor control path including an emitter current limiting resistive element in series circuit relationship, (b) a transmission line section comprising first and second parallel spaced co-extensive conductor wires spaced by a conventional distance adapted to provide distributed constant transmission line network characteristics, said transmission line section having a predetermined electrical length less than one-eighth of a wavelength at said desired frequency, (c) said emitter electrode and said collector electrode, being connected to said first and second conductor wires, respectively at one of their co-adjacent ends, (d) a lumped constant capacitative circuit element connected between said emitter and collector electrodes, (e) means operating as an effective short circuit at the frequency of oscillation inter-connecting the other co-adjacent ends of the conductor wires and the base electrode, and by-passing said emitter current limiting resistance element, whereby said first conductor wire, at the frequency of oscillation, has its opposite ends effectively connected directly to the base and emitter electrodes, respectively, (f) said capacitative circuit element having such value of capacitance and said transmission line section being of such effective length that, in operation, feedback from the transmission line section, principally by way of the first conductor wire across the base and emitter electrode, is such as to sustain oscillations in the circuit, (g) said collector electrode being connected through said second conductor wire to one side of a collector biasing potential source and said emitter being connected through said first conductor wire and through said emitter current limiting resistive element to one side of an emitter biasing potential source which is at a polarity opposite to that of said one side of the collector biasing potential source, said base electrode being connected to the other side of the sources of potentials, (h) a further transistor of the conductivity type opposite to that of the first said transistor, the emitter electrode of the further transistor being coupled to the end of the first conductor at the other of co-adjacent ends of the wires and the collector electrode being coupled to said one side of the emitter biasing source, and (i) circuit means being provided for applying a modulating signal to the base electrode of the further transistor.

References Cited by the Examiner

UNITED STATES PATENTS

| | | | |
|---|---|---|---|
| 2,262,365 | 11/41 | Kinn | 333—82 |
| 2,701,842 | 2/55 | Hagopian | 331—101 X |
| 3,076,945 | 2/63 | Coombs | 331—117 |

OTHER REFERENCES

Article by Nelson et al., in Proceedings of the IRE, vol. 46, No. 6, June 1958, page 1215.

RCA Booklet, Practical Analysis of Ultra High Frequency, by Meagher et al., Aug. 1943, page 4.

"Simple Metal Locator," Calvert, Electronics World, vol. 66, July 1961, page 73.

ROY LAKE, *Primary Examiner.*

JOHN KOMINSKI, *Examiner.*